Oct. 26, 1943.  H. M. KNIGHT  2,332,648
AIRCRAFT
Filed Jan. 17, 1939
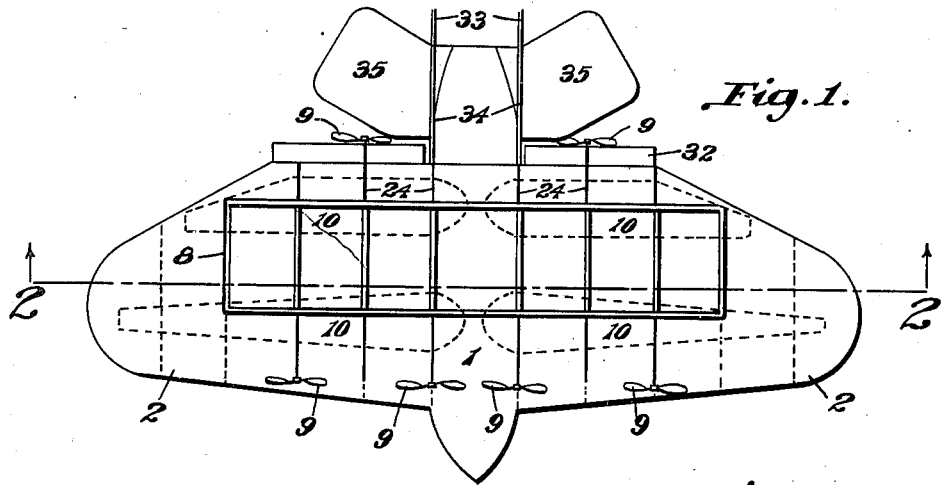
Fig. 1.
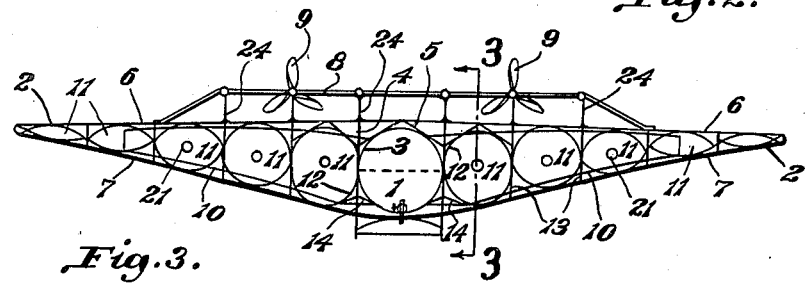
Fig. 2.
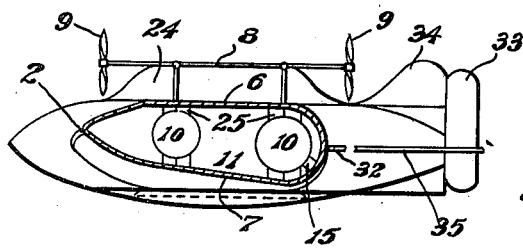
Fig. 3.
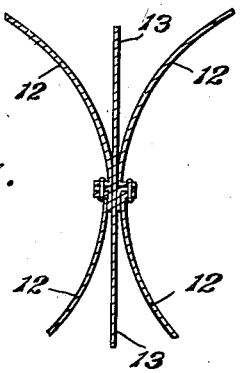
Fig. 5.
Fig. 4.
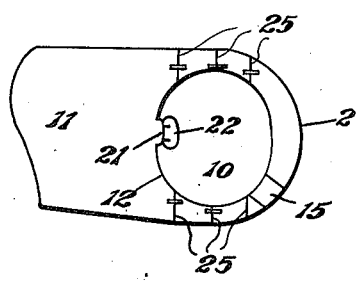
Inventor
Herbert M. Knight
by: Howard P. King
Attorney Patented Oct. 26, 1943

2,332,648

UNITED STATES PATENT OFFICE 2,332,648

AIRCRAFT

Herbert M. Knight, Montclair, N. J.

Application January 17, 1939, Serial No. 251,334

4 Claims. (Cl. 244—5)

This invention relates to improvements in aircraft, and is more particularly related to such aircraft in which the more particular portion of the aircraft constitutes the wings thereof, and in which the structure comes within the category of heavier than air machines.

One of the objects of this invention is an aircraft in which the wings thereof shall constitute a portion of the structure used for the occupancy and transportation of passengers and freight. Another object of the invention is an aircraft in which the wings shall be formed upon and strengthened by a tubular reticulation. A further object of the invention is an aircraft in which tubular rectilinear reticulations intersect in normal planes. Still a further object of the invention is an aircraft in which such normally intersecting reticulations are of different dimensions, the lesser of which said reticulations are continued through the larger of such tubular reticulations. Still a further object of the invention is an aircraft in which the wing structure is reinforced at points of intersection of normal reticulations. Another object of the invention is an aircraft in which such a wing structure is combined with a bridge, for greater strength. Still another object of the invention is an aircraft in which a wing structure, having a tubular reticulation combined with a strengthening bridge, has its propelling means supported by said bridge. Another object of the invention is the securing of an enclosed wing space, in which gases, lighter than air, can be confined, for lightening the structure at times of take-off. A further object of the invention is a structure in which floors and ceilings of the central hull are used as means for transmitting and sustaining stresses received from the tubular supporting girders of the wings. Another object of the invention is the use of cross-girders in the hull as abutments for the said supporting girders of the wings. A further object of the invention is the employment of fillets at junction points of shell and floors as strengthening means. Still another object of the invention is the pocketing of air beneath the hull by means of longitudinal and cross-dams. Another object of the invention is a means of trimming the longitudinal displacement by means of compressed air. Other objects of the invention will appear from the specifications and from the accompanying drawing.

The accompanying drawing represents the usual and preferred embodiment of the invention, but the said drawing is not to be interpreted as exhibiting the only form in which the improvement may be embodied nor as excluding other forms not shown.

I illustrate my invention by the following drawing in which Fig. 1 is a horizontal view of the top of such an aircraft; Fig. 2 is a vertical cross-section of the aircraft on the line 2—2 of Fig. 1; Fig. 3 is a vertical transverse cross-section of the wing construction on the line 3—3 of Fig. 2; Figure 4 is a section of the communicating junction of longitudinal and transverse tubes; and Figure 5 is a sectional view on a scale somewhat larger than the other figures, showing the contact construction of shells and plates.

As usually constructed, aircraft consist of a central portion for the accommodation of passengers, freight and operating forces, exterior to which central compartment, and on either side of which, are wings, such wings acting solely as supporting members during flight. Such wings are usually of relatively minor thickness, as compared with the thickness, or depth, of the central structure, and are not usable either as storage or revenue space. This application departs from such usual practice in that the wing structure is of varying thicknesses, or depths, both longitudinally and transversely. At points adjacent to the central structure the wings have a depth approaching that of the central hull portion, or of a story thereof, in case the central hull has more than a single floor or horizontal compartment, from which adjacent point the wings gradually taper at front and outer edges to a thin edge, presenting a minimum of resistance to the passage of the aircraft at high speeds. By reason of such departure from current practice, it becomes possible to utilize the wings, in addition to the central hull, for the use and transportation of passengers and freight, doing this with the same facility and comfort as in the central hull compartments. The wings become, therefore, an integral portion of the aircraft, instead of a supporting means only.

The above desirable features are secured by means of a central compartment, or hull, which is a unitary, girder-like structure 1 of great strength, which said central unitary structure, consisting of curvilinear interior shells 3, vertical plate girders 4 and inclined plates 5, is extended into the wings 2 where it is connected with a longitudinal, tubular rectilineation, or girder 10, possessing the same desirable features as the central structure in such an arrangement of longitudinal and transverse tube, vertical plate girders 13 and inclined plates 14 as will give a maximum of strength with a minimum of material. By such a combination, stresses are transmitted directly to the central structure 1, which is reinforced to meet such stress. The longitudinal tubular wing girders 10 are of varying sizes and radii of curvature in order to meet the varying thicknesses and dimensions of the wings. Usually the longitudinal tubes 10 are housed within the transverse tubes 11 normal thereto, at their points of intersection, at which points of intersection the longitudinals are substantially reinforced, such design acting to cause the tubes of the wings to act together in carrying and resisting stresses. Entry from the longitudinal tubes to the transverse tubes may be had through openings 21 each of which is preferably provided with a door or closure 22.

A very strong, and at the same time a very light, central compartment 1 is made up of an inner curvilinear shell 3, in combination with vertical longitudinal plate girders 4, and inclined plates 5, such shell and plating having tangential and other points of contact, at which contact points the several component parts are rigidly and firmly fastened together, preferably by welding.

The wing structure 2, which in general design is a close duplicate of the central compartment of the hull, is referred to as "wings" herein, although such designation neither establishes nor implies that such wings are an independent appliance, the purpose and result of this improvement being that the wings are a part of the revenue producing portion of the aircraft, and act in the same capacity as does the central portion of the aircraft.

The central compartment 1, the various structural elements which constitute the unitary girder-like structure thereof, and the elements of the wing construction, are tied together so completely as to constitute a unitary structure for the entire aircraft. The outer vertical plates 4 of the central structure are in contact with the shells 12 of the wing tubes, a plurality of such tubes forming an element in the wing reticulation. The inclined plates 14 of the wing structure have connection also with said vertical plates 4 of the central compartment, at which junction points they are securely fastened together. Such inclined plates 14 are also tangentially in contact with the tube shells 12, and with the vertical wing plates 13, at all of which contact points the several structural elements are securely fastened together. It is apparent that through this combination of connected shells 12, wing plates 13 and inclined plates 14, that a very light and strong wing construction is realized, that the several elements act in concert to resist and transmit stresses and that a direct transmission is realized to the central hull structure.

The wing plates 13 are of varying depths in order to meet the varying thicknesses of the wings. Likewise the tubes, both longitudinal 10 and transverse 11, are of varying dimensions and forms, in order to meet the requirements resulting from varying wing dimensions. In order to fully comply with such requirements these tubes are of many forms, such as circular, oval, lenticular, etc., throughout the length of a single tube. Usually the spacing of the wing plates 13 is uniform, and the tubes variable in dimension, such arrangement operating for a better type of construction and a more positive determination of the forces to be met. Longitudinal tubes are usually in parallel multiples.

The wings are provided at top and bottom with top and bottom skins 6, 7 respectively, are constructed with a relatively sharp front edge, and the result is a section in which the front longitudinal tube is of relatively smaller diameter, while the rear longitudinal tube is much larger. The front longitudinal tube therefore is of no value as and for freight or passenger use, although it may be used very effectively as a service corridor leading to the engines, in cases where the propulsive machinery is installed upon the leading edge of the wings. The rear longitudinal tube is usually of such size as to permit comfortable use for a very considerable distance from the central hull. In order to permit of such use by passengers, with satisfactory light and view, observation rooms, or ports 15, lead from the rear longitudinal to the skin 7.

The best form of construction is obtained by making one set of tubular reticulations of smaller diameter or dimension, than the tubes normal thereto, the usual practice being to have the longitudinal tubes 10 of such lesser dimension. This practice retains all of the material strength inherent in each reticulation at their intersecting points, permitting the addition of all necessary reinforcement at such intersection. Such reinforcement 25 usually consists of plates above and below the smaller dimensioned tube, securely fastened to both said tubes, the reinforcement thus aiding materially in the transfer of stresses to the central structure.

Above the wings 2, and central structure 1, may be placed a light, low bridge 8, this bridge being fastened to the upward extensions 24 of the vertical plates 4 and 13, which have been carried above the aircraft and the wings for this purpose. This bridge is securely fastened to all of these vertically extended members, one of its offices being to strengthen the entire structure, which it does through the contact with and fastening to the plates of aircraft and wings, and because of its attachment to these other members, the sizes and weights of the plane proper may be reduced below what otherwise, and in the absence of such bridge, be required. Another office of this bridge is to act as a support to the engines when they are installed above the plane instead of being located upon the edges of the wings. In the practical application of the improvements covered by this application, engines may be located either on the wing structure or upon the bridge, whichever may be deemed most desirable. A further and great advantage in the use of a bridge as a supporting means for the propelling units, is that it becomes possible to locate the engines in such a way as that electric motors may be directly attached to the propellers 9 permitting the engines and generators to be located within the body of the aircraft, and arrangement making for greater safety, accessibility and reliability.

An aircraft of the type and character delineated is necessarily a heavy structure, and its ascension from a harbor, under certain conditions of wind, weather and weight, will be difficult. The aircraft includes, as conventionally shown, usual or appropriate characteristics as sponsons 31, ailerons 32, rudder 33, vertical stabilizer 34 and elevators 35 as will be understood by those skilled in the art to which the invention appertains.

What I claim is:
1. In a structure of the class described, the combination of a central hull, said hull comprising curvilinear shells in combination with vertical and inclined plates tangential to and immov- ably fastened to said shells, a wing structure, said structure comprising longitudinal tubes immovably fastened to said hull, transverse tubes immovably fastened to said longitudinal tubes, and vertical plates between and fastened to adjacent transverse tubes.

2. In a structure of the class described, the combination of a central hull, said hull comprising curvilinear shells in combination with vertical and inclined plates tangential to and immovably fastened to said shells, a wing structure, said structure comprising longitudinal tubes immovably fastened to said hull, transverse tubes immovably fastened to said longitudinal tubes, vertical plates between and fastened to adjacent transverse tubes, and a skin attached to said longitudinal and transverse tubes and to said plates.

3. An aircraft comprising a central hull, wing structures at opposite sides of said hull, said hull having a curvilinear shell and flat shell portions tangential to said curvilinear shell at successive intervals around the same with the successive flat shell portions secured to each other reenforcing the curvilinear shell, and said wing structures each comprising a series of substantially contacting rigid tubes parallel to each other and to said hull and connected together successively, said wing structures including other tubes transverse to and intersecting the aforementioned tubes and hull and extending in directions longitudinally of the wings, said hull and tubes parallel to the hull each having interior communication with said tubes transverse to and intersecting the same.

4. An aircraft comprising a central hull, wing structures at opposite sides of said hull, said hull having a curvilinear shell and flat shell portions tangential to said curvilinear shell at successive intervals around the same, a pair of bulkheads in and transverse to said hull, and said wing structures each comprising a series of substantially contacting rigid tubes parallel to each other and to said hull and connected together successively, said wing structures also having other tubes transverse to and intersecting the aforementioned tubes and hull and extending in directions longitudinally of the wings outwardly from the hull at the part thereof between the bulkheads of said pair of bulkheads and abutting upon and immovably fastened to said bulkheads, and each of said tubes longitudinally of the wings forming a truss framework from the hull for the wings and each having a usable compartment therein connecting with the interior of the hull between said bulkheads.

HERBERT M. KNIGHT.